(No Model.)
J. H. MINER.
SAWMILL DOG.
No. 521,723.
Patented June 19, 1894.
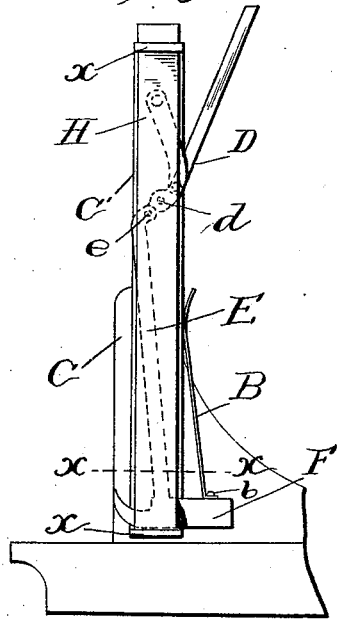
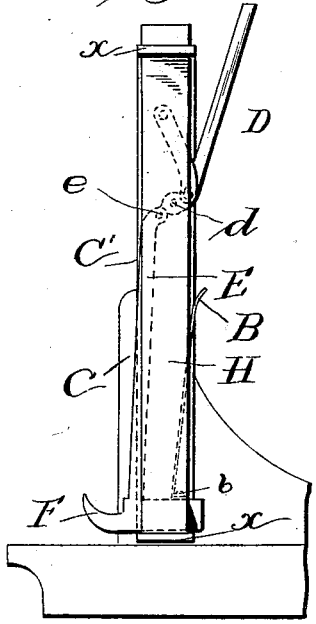
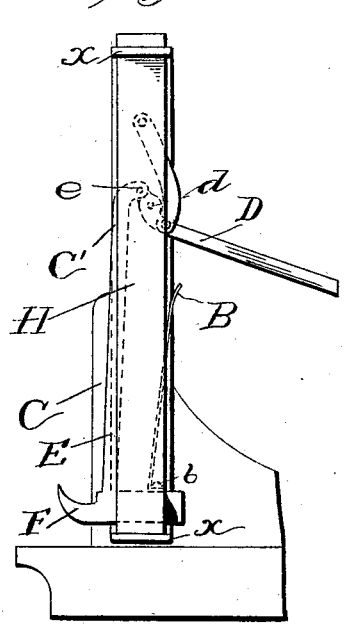
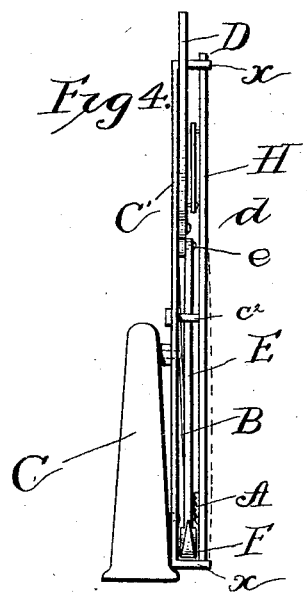
Attest
Wm. F. Hall
F. L. Middleton
Inventor
J. H. Miner
by Ellis Spear
Atty

UNITED STATES PATENT OFFICE.

JAMES H. MINER, OF BILOXI, MISSISSIPPI.

SAWMILL-DOG.

SPECIFICATION forming part of Letters Patent No. 521,723, dated June 19, 1894.

Application filed October 23, 1893. Serial No. 488,904. (No model.)

*To all whom it may concern:*

Be it known that I, JAMES H. MINER, a citizen of the United States of America, residing at Biloxi, in the county of Harrison and State of Mississippi, have invented certain new and useful Improvements in Sawmill-Dogs, of which the following is a specification.

My invention relates to saw mill dogs similar to the one illustrated in an application filed by me in the United States Patent Office on the 11th day of April, 1893, Serial No. 469,863.

The object of my invention is to generally improve the details of construction to provide a simple, durable and effective device.

The invention is illustrated in the accompanying drawings, in which—

Figure 1, is a side elevation of the dog as it appears when not in use. Fig. 2, is a view showing the point of the dog in proximity to the log ready to grip the same. Fig. 3, is a similar view showing the dog in the position it assumes when gripping the log. Fig. 4, is a view at right angles to Fig. 3, and Fig. 5, is a section on line $x$—$x$, Fig. 1. Fig. 6, is a detail illustrating the strengthening connection between the rigid and sliding plates.

In the drawings herein referred to it will be observed that only the lower dog is shown as any form of upper dog may be used as is found desirable.

The standard of the mill carriage is shown at C and has securely bolted thereto a bar C' to which is pivotally connected the operating handle or lever D mounted upon a pivot. From the short end of this lever is suspended the vertical bar E by a pivot $e$ and upon the lower end of the bar is rigidly mounted the lower dog F which is preferably of the shape shown in the drawings and may if desired be formed integrally with the said bar. A sliding bar H, working in gibs or mortises $x$, $x$, at top and bottom of the stationary bar C' and extending parallel therewith holds the dog and its suspending bar in proximity to the standard and the point of the dog is normally kept back in rear of the forward edge of the stationary bar out of the way by a spring B which is secured to the rear end of the dog by a set screw $b$ and which has its upper end bearing against the rear face of the stationary bar. A link $d$ connects the lever D and bar H. When a log is placed against the standard the operator, by a forward movement of the foot throws the dog forward into the position shown in Fig. 2, and when in this position the downward movement of the handle lifts the dog upward and drives the point of the dog into the log as shown in Fig. 3.

I have found that it is desirable to provide means for holding the dog in its advanced position after it has been thrown forward by the foot against the pressure of the spring and against the resistance of the log and to this end have provided a friction block A which is secured to the bar H between the uprights and partly fills the space between the stationary bar and the bar H, above the line of the dog when the said dog is in its lowest position. The dog is formed somewhat thicker than the bar E which supports it, thus permitting the bar to swing freely past the block, but it will be observed that the upward movement of the dog will cause it to be wedged in between the face of the block and the inner face of the bar H, thus holding it firmly in its advanced position. The bar H is sufficiently thin to allow it to spring somewhat as shown in dotted lines in Fig. 4, thus permitting the wedging action and this spring action will take up any wear and keep the parts in effective working order. It will be readily understood that if the spring action of the bar is not sufficient to take up the wear, any well known means may be used for this purpose, and indeed if desired a clamp of any desired and well known form might be added for clamping the lower dog without departing from the spirit of my invention. To prevent the bar from springing too much I find it desirable to form a slot $c$ in the stationary bar C' extending lengthwise thereof, and I secure to the rear face of the sliding bar H a bolt $c^2$ having a T shaped head extending behind the bar C' so that vertical movement is permitted but only a limited amount of side motion. I find it desirable to corrugate the face of the block in order to more effectually grip the dog.

If desirable I may so weight and hang the lower dog that it will be kept normally in rear of the front face of the standard by force of gravity but I prefer to use the spring as giving a quicker and more sure action and have therefore shown the spring only in the present drawings.

I claim—

1. In combination with the standard, the pivoted operating lever, the bar suspended from said lever having a dog connected to the lower end thereof, said dog being held normally in rear of the front face of the standard and adapted to be projected beyond the same by the foot of the operator, and means for engaging the dog as it is raised to prevent its backward movement, substantially as described.

2. In combination with the standard, a lever pivoted thereto, a swinging bar suspended therefrom having a dog of increased thickness rigidly connected thereto and held normally in rear of the front face of the standard, a sliding bar held parallel to the standard and a gripping block secured to the sliding bar, for gripping the dog between itself and the bar as the dog is raised when in its forward position, substantially as described.

3. In combination with the saw carriage standard, the stationary bar connected thereto, an operating lever pivoted on said stationary bar, a movable bar sliding in guide ways on the stationary bar and having connection with the operating lever, a swinging bar depending from the operating lever between the stationary and sliding bars, and carrying a dog, and a friction block carried by the sliding bar for engaging said dog, substantially as described.

In testimony whereof I affix my signature in presence of two witnesses.

JAMES H. MINER.

Witnesses:
 A. W. DAHLGREN,
 L. E. COX.